No. 750,130. PATENTED JAN. 19, 1904.
J. N. SMITH.
NUT LOCK.
APPLICATION FILED JULY 29, 1903.
NO MODEL.

Witnesses
Geo. Ackman Jr.
Herbert D. Lawson.

Inventor
J. Nash Smith
By Victor J. Evans,
Attorney

No. 750,130. Patented January 19, 1904.

UNITED STATES PATENT OFFICE.

JOHN NASH SMITH, OF ROANOKE, VIRGINIA, ASSIGNOR OF ONE-HALF TO ROCKINGHAM PAUL AND JOSEPH S. TIPTON, OF ROANOKE, VIRGINIA.

NUT-LOCK.

SPECIFICATION forming part of Letters Patent No. 750,130, dated January 19, 1904.

Application filed July 29, 1903. Serial No. 167,414. (No model.)

*To all whom it may concern:*

Be it known that I, JOHN NASH SMITH, a citizen of the United States, residing at Roanoke, in the county of Roanoke and State of Virginia, have invented new and useful Improvements in Nut-Locks, of which the following is a specification.

My invention relates to new and useful improvements in nut-locks especially adapted for use in securing fish-plates to railroad-rails; and its object is to provide a washer which is adapted to engage a bolt and which has a curved arm eccentrically arranged at its edge and provided with teeth.

A further object is to employ a nut having an arm extending from its inner face which is adapted to contact with a spring-arm of a washer and engage the teeth thereon.

With the above and other objects in view the invention consists in the novel construction, combination, and arrangement of parts hereinafter more fully described and claimed, and illustrated in the accompanying drawings, in which—

Figure 1:
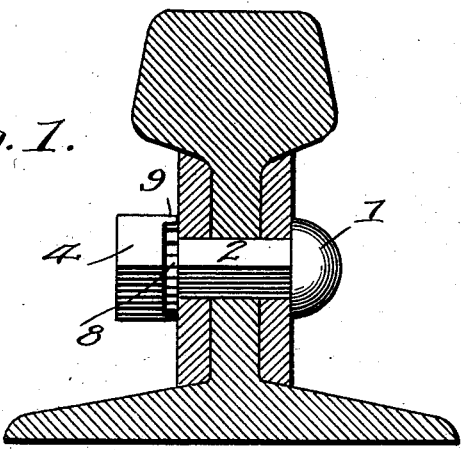
Figure 2:
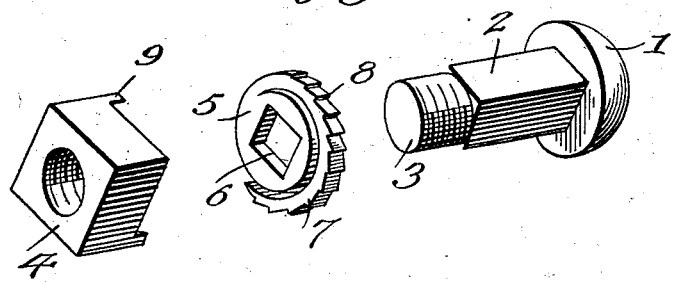
Figure 3:
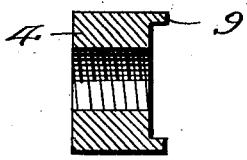
Figure 4:
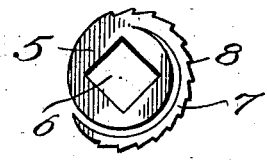

Figure 1 is a vertical transverse section through a rail-joint and showing my improved nut-lock in position thereon. Fig. 2 is a perspective view of the nut-lock, the parts thereof being detached. Fig. 3 is a section through the nut, and Fig. 4 is an elevation of the spring-washer.

Referring to the figures by numerals of reference, 1 is a bolt preferably provided with a squared portion 2 and having a screw-threaded end 3, adapted to be engaged by a nut 4 of form. A spring-metal washer 5 is provided with an aperture 6, adapted to receive the angular portion 2 of the bolt, and integral with this washer is a curved spring-arm 7, which extends partly around the washer in the same plane therewith and eccentric thereto. Teeth 8 are formed on the outer face of this arm, and the distance from the center of the washer to the teeth is normally slightly greater than the distance from the center of the nut to the corners thereof. Lugs 9 are arranged at opposite corners of the nut 4 and in alinement with the side faces of said nut.

In assembling the parts of this device the bolt is inserted through the parts to be clamped together, and washer 5 is then placed upon the angular portion thereof. Nut 4 is placed in engagement with the threaded portion 3 of the bolt and screwed thereon, so as to cause the lugs 9 to overlap and partly compress the spring-arm 7. It will be understood that as the movement of the nut is continued the lugs 9 will slip over the teeth 8; but it is impossible to reverse the movement of the nut, as said teeth will engage the lugs and stop further movement. Before the nut can be removed it is necessary to insert a suitable tool in the rear of the nut and compress the arm 7, so as to retract the teeth 8 from engagement with the lugs.

While the bolt is preferably provided with an angular portion, I do not restrict myself to this construction, for, if desired, an ordinary bolt may be employed and the washer 5 provided with teeth upon one face for engaging one of the articles to be clamped by the nut.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as may fairly fall within the scope of my invention.

Having thus described the invention, what is claimed as new is—

1. In a nut-lock the combination with a bolt; of a washer adapted to engage the same, a spring-arm integral with the washer, and eccentric thereto but in the same plane therewith, teeth upon the outer face of the arm, a nut, and lugs upon the nut adapted to overlap the teeth, the teeth being continuously engaged by one of the lugs when overlapped thereby.

2. In a nut-lock the combination with a bolt having an angular portion, of a washer adapted to engage the angular portion, a spring-arm integral with the washer and eccentric thereto, said arm being in the same plane with the washer, teeth upon the outer face of the arm, a nut, and lugs integral with and extending inwardly from the nut and adapted to overlap and engage the teeth.

In testimony whereof I affix my signature in presence of two witnesses.

JOHN NASH SMITH.

Witnesses:
LAWRENCE S. DAVIS,
ROCKINGHAM PAUL.